Aug. 9, 1932. W. G. KOUPAL 1,871,218
APPARATUS FOR MAKING PLATE GLASS
Filed Aug. 26, 1931 2 Sheets-Sheet 1
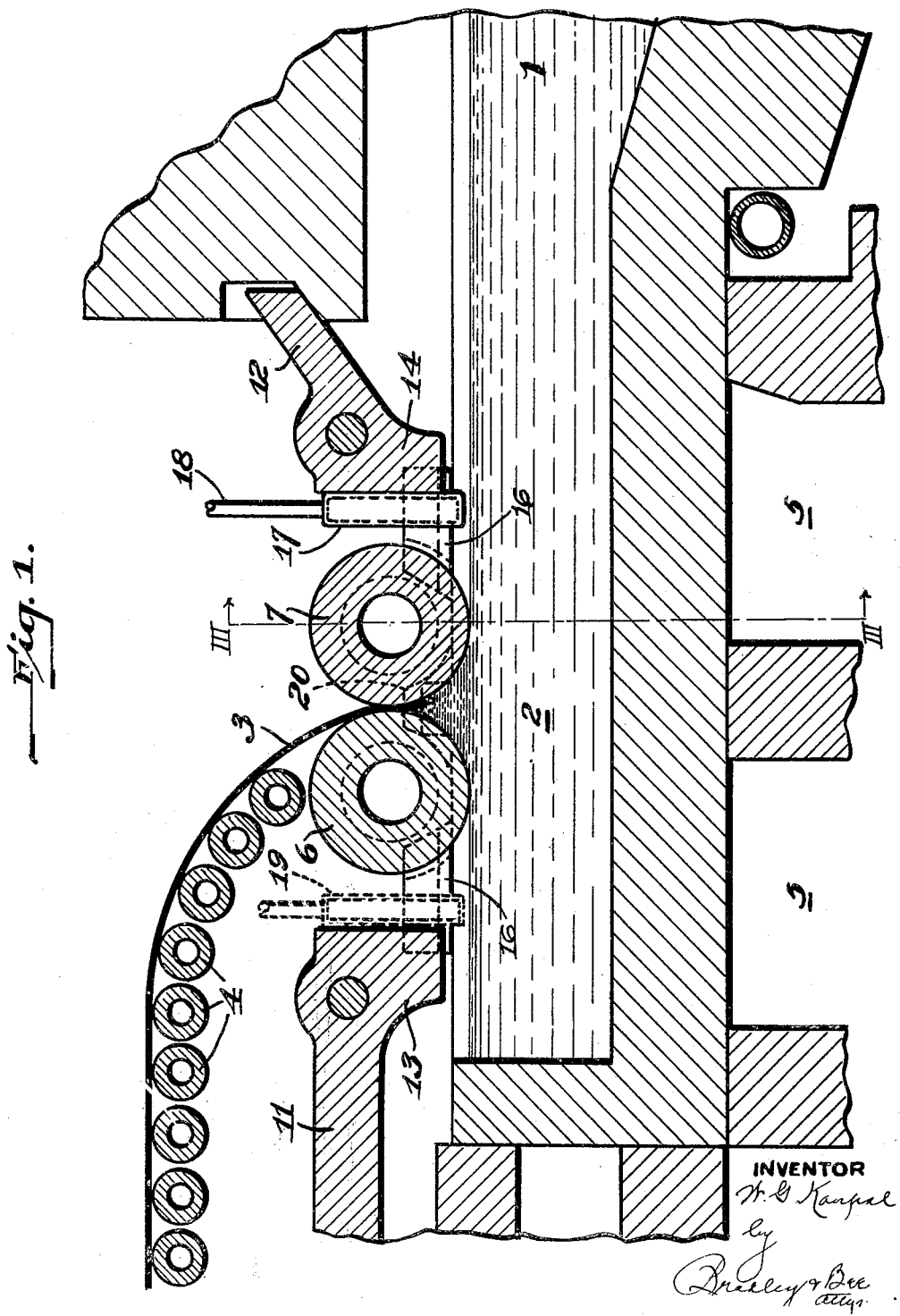
INVENTOR Aug. 9, 1932.     W. G. KOUPAL     1,871,218
APPARATUS FOR MAKING PLATE GLASS
Filed Aug. 26, 1931    2 Sheets-Sheet 2
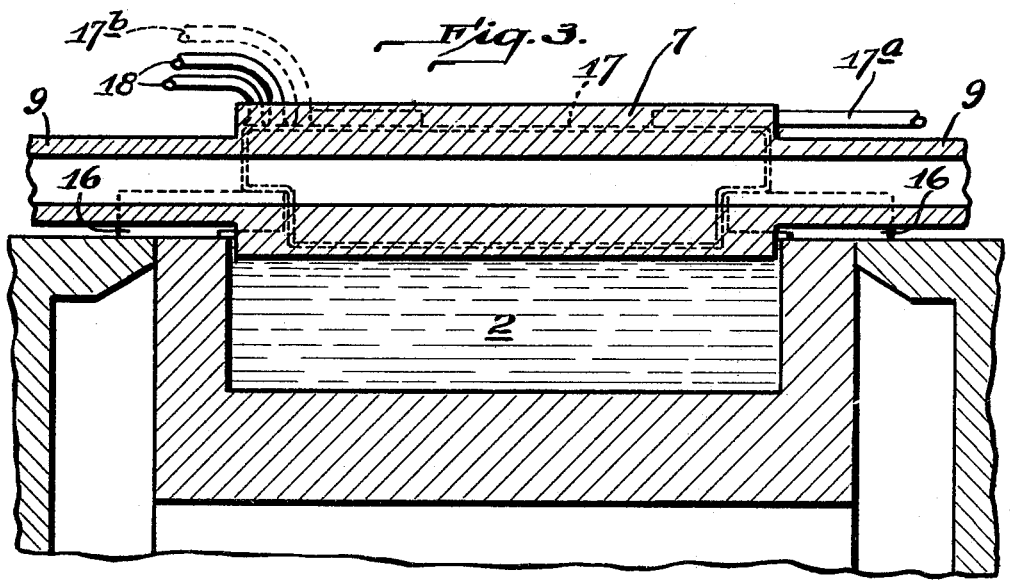
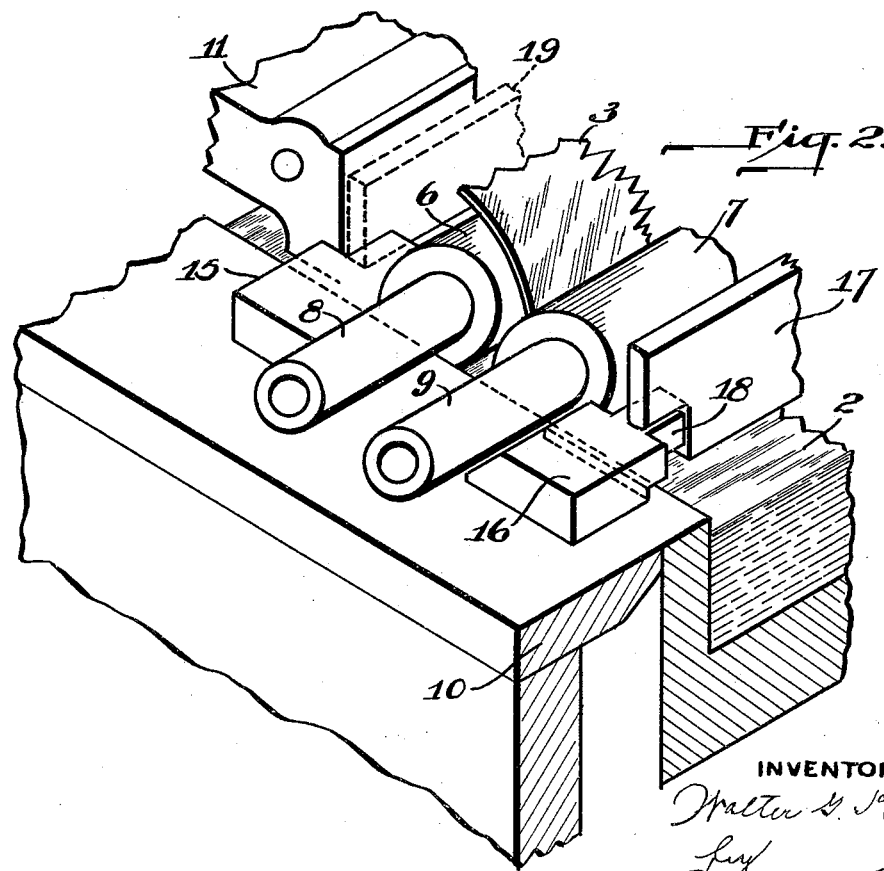
INVENTOR
Walter G. Koupal Patented Aug. 9, 1932

1,871,218

UNITED STATES PATENT OFFICE

WALTER G. KOUPAL, OF TARENTUM, PENNSYLVANIA, ASSIGNOR TO PITTSBURGH PLATE GLASS COMPANY, A CORPORATION OF PENNSYLVANIA

APPARATUS FOR MAKING PLATE GLASS

Application filed August 26, 1931. Serial No. 559,411.

The invention relates to an apparatus for making plate glass by a continuous vertical rolling process wherein a pair of horizontal sizing rolls are located with their lower sides in a glass bath and a sheet is formed therebetween which is carried first upwardly and then laterally through a horizontal leer. In the operation of this apparatus one of the serious difficulties encountered is the securing of a good edge upon the sheet formed and it is ordinarily necessary to trim off four or five inches at each edge of the sheet due to the imperfections in the edge glass. This is due in large degree to a temperature condition which exists at the edges of the bath from which the sheet is drawn. The glass along the sides of the pot or extension from which the sheet is withdrawn is exposed to extra cooling and becomes cold and stiff as compared with the glass in the extension which is remote from such sides. As a result this glass at the edges flows very slowly and devitrifies, thus retarding the flow of glass to the ends of the rolls where the edges of the sheet are formed. Consequently the edges of the sheet are rough and irregular and require continual attention. The glass at the extreme ends of the rolls is further of too low a temperature to allow good adhesion to the rolls to occur, and slippage lines appear at the edges of the sheet which, as stated before, cause four to five inches loss, and also cause bubbles to be formed which may appear in other parts of the sheet than the edge portions. The present invention is designed to overcome this difficulty by preventing too great radiation of heat from the glass next to the sides of the tank in proximity to the ends of the rolls and by reducing the effect of the water coolers employed on the glass and rolls at these points. One embodiment of the invention is shown in the accompanying drawings, wherein:

Figure 1 is a vertical section through a portion of a glass tank equipped with the improvement. Fig. 2 is a perspective view showing the construction to which the invention particularly relates. And Fig. 3 is a section on the line III—III of Fig. 1.

Referring to the drawings, 1 is a melting tank provided at its end with a pot or extension 2, from which the glass sheet 3 is withdrawn and carried upward and laterally on the runway comprising the cooled rollers 4. The glass sheet is formed continuously and carried into and through a roller leer, not shown. Beneath the extension 2 is a fire box or heater provided with flues 5 for gases of combustion, which are provided with suitable Bunsen burners as is well known in the art. The glass sheet 3 is formed by means of a pair of driven water cooled rollers 6, 7, whose peripheries lie in the molten glass of the extension 2. These rolls may be driven and cooled in any suitable manner, such as indicated in the patent to Frederick Gelstharp No. 1,615,834, dated February 1, 1927. The rolls are provided with shaft portions 8, 9, as indicated in Figs. 2 and 3, such shaft portions lying above the side walls 10 of the pot or extension and being mounted in suitable bearings. Lying above the surface of the glass in the extension 2 are a pair of shade stones 11, 12, such stones being made of refractory material and serving to restrict the radiation of heat from the glass bath. These stones are provided with downwardly projecting lips 13 and 14 whose lower edges lie just above the surface of the glass, the inner faces of the lips being spaced away from the rolls 6 and 7, as indicated in Fig. 1.

Seated upon the side walls of the tanks at the ends of the sizing rolls 6 and 7 are pairs of blocks 15, 15 and 16, 16 of refractory material such as fire clay. These blocks have their inner surfaces fitted to the contour of the rolls and their shaft extensions and project out over the surface of the glass a substantial distance, as indicated in Figs. 2 and 3. These blocks serve to restrict the radiation of heat from the surface of the glass closely adjacent the tank walls so that such glass is kept at a higher temperature than would be the case if the blocks were not used. This is desirable for the reason heretofore pointed out as the formation of devitrified glass at the ends of the rolls is avoided and the rolls have a better traction upon the glass at these points due to the higher temperature of the glass. This reduces the slippage at these points and avoids the defect incident to such slippage so that a much smoother edge is secured upon the edge of the roll than would otherwise be the case.

The cooler 17 lies between the shade stone 12 and the roll 7 with its ends on top of the shade blocks 16, 16, as indicated in Figs. 2 and 3. This cooler is of metal, rectangular in cross section, and is provided with a pair of pipes 18, 18 by means of which a circulation of water may be secured through the member. It serves to provide additional cooling for the roll 7 and for the glass bath on the tank side of such roll, this being desirable because the temperature conditions at this side of the pair of rolls are relatively high as compared with those at the other side of the pair of rolls due to the proximity of the melting tank and to the relatively high temperature of the glass flowing from the tank to the drawing extension. The water cooler may be supported from above by any suitable means, such as the bars 17a and 17b secured to the framework surrounding the tank and preferably adjustable vertically and horizontally.

The ends of the water cooler are notched out, as indicated at 18 in Fig. 2, so that shoulders are provided lying above the block 16, 16 and contacting therewith. This notching of the ends of the water cooler reduces the cooling effect of the water cooler upon the glass adjacent the ends of the rolls and also reduces the cooling effect of the cooler upon the ends of the rolls which is desirable for the reason heretofore indicated, inasmuch as the difficulty incident to the use of this type of apparatus is due to the relatively low temperature condition of the glass at the ends of the rolls. The mounting of the ends of the cooler on the shade blocks not only removes the end of the cooler from close proximity to the glass at the ends of the rolls but the ends of such blocks shield the ends of the rolls to a substantial degree from the cooling effect of the cooler. A similar cooler 19 may be used opposite the roll 6, as indicated in dotted lines in Fig. 1, but ordinarily this is not required. Such cooler, if used, may be mounted above the pair of shade blocks 15, 15, as heretofore described in connection with the block 16, 16. Triangular members 20, 20 are used at the ends of the rolls to prevent the glass from spreading out laterally. Such members are known as "guns", but are well known in the art and constitute no part of the present invention. Metal guns are preferably used which are hollow and heated by gas as shown in my Patent No. 1,519,314.

The use of the shade blocks 15, 15 and 16, 16 substantially improve the temperature conditions at the ends of the rolls so that much smoother edges are formed than is the case where such blocks are not used and slippage lines are substantially eliminated. As a result, only an inch or two at each edge of the sheet need be trimmed off as compared with four or five inches as has heretofore been required so that the improvement gives a substantial increase in the production from the machine.

What I claim is:

1. In combination, a glass tank containing a body of molten glass and open above a portion of such body, a pair of horizontal driven and cooled sizing rolls seated above said portion of the body of glass and having the lower portions of their peripheries immersed in such body, shade stones on each side of the pair of rolls extending across the top of the tank and provided with lips above the surface of the glass adjacent to the rolls but spaced away therefrom, and shade blocks seated on the walls of the tank between the shade stones and rolls and extending out over the body of glass and adapted to restrict the cooling of the glass therebeneath.

2. In combination, a glass tank containing a body of molten glass and open above a portion of such body, a pair of horizontal driven and cooled sizing rolls seated above said portion of the body of glass and having the lower portions of their peripheries immersed in such body, shade stones on each side of the pair of rolls extending across the top of the tank and provided with lips above the surface of the glass adjacent to the rolls but spaced away therefrom, and shade blocks seated on the walls of the tank between the shade stones and rolls and extending out over the body of glass and adapted to restrict the cooling of the glass therebeneath, such blocks being fitted on their edges to the contour of the rolls.

3. In combination, a glass tank containing a body of molten glass and open above a portion of such body, a pair of horizontal driven and cooled sizing rolls seated above said portion of the body of glass and having the lower portions of their peripheries immersed in such body, shade stones on each side of the pair of rolls extending across the top of the tank and provided with lips above the surface of the glass adjacent to the rolls but spaced away therefrom, shade blocks seated on the walls of the tank between the shade stones and extending out over the surface of the glass, and a hollow water cooled member of rectangular cross section lying between one of said lips and the adjacent roll with its ends lying over the shade stones at the ends of the roll, said member being shaped so that the lower portion thereof lies below the level of the upper surfaces of the shade blocks with the ends of said portion remote from the side walls of the tank.

In testimony whereof, I have hereunto subscribed my name this 12th day of August, 1931.

WALTER G. KOUPAL.